July 12, 1960  R. KATZ ET AL  2,944,801
ROTARY INTERCHANGER WITH DIRECT INTERFACIAL FLUID CONTACT
Filed May 9, 1955  3 Sheets-Sheet 1
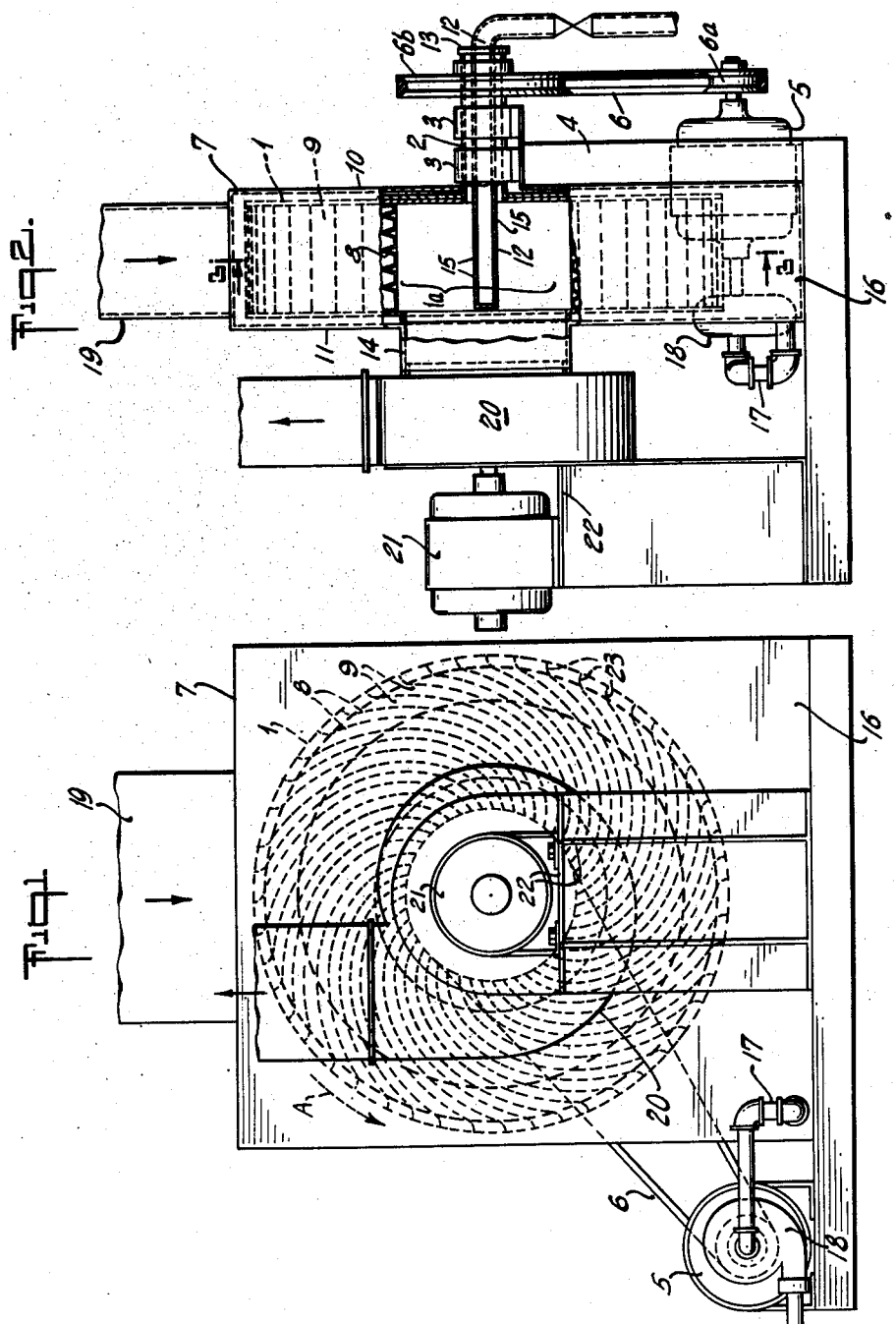
INVENTORS:
ROBERT KATZ
WILLIAM H. NEBGEN
BERNARD ANIK
BY
ATTORNEY

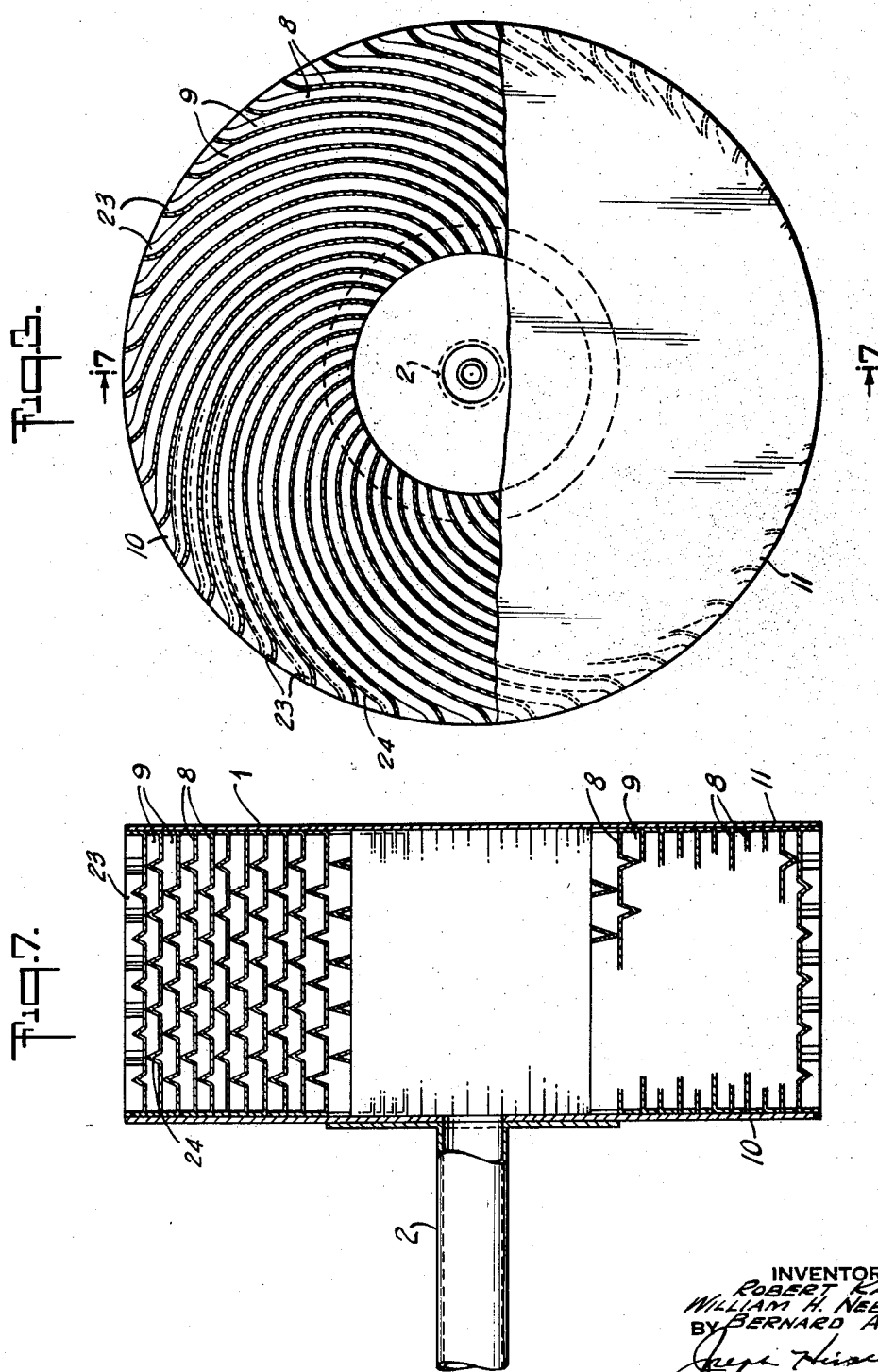

July 12, 1960 R. KATZ ET AL 2,944,801
ROTARY INTERCHANGER WITH DIRECT INTERFACIAL FLUID CONTACT
Filed May 9, 1955 3 Sheets-Sheet 3
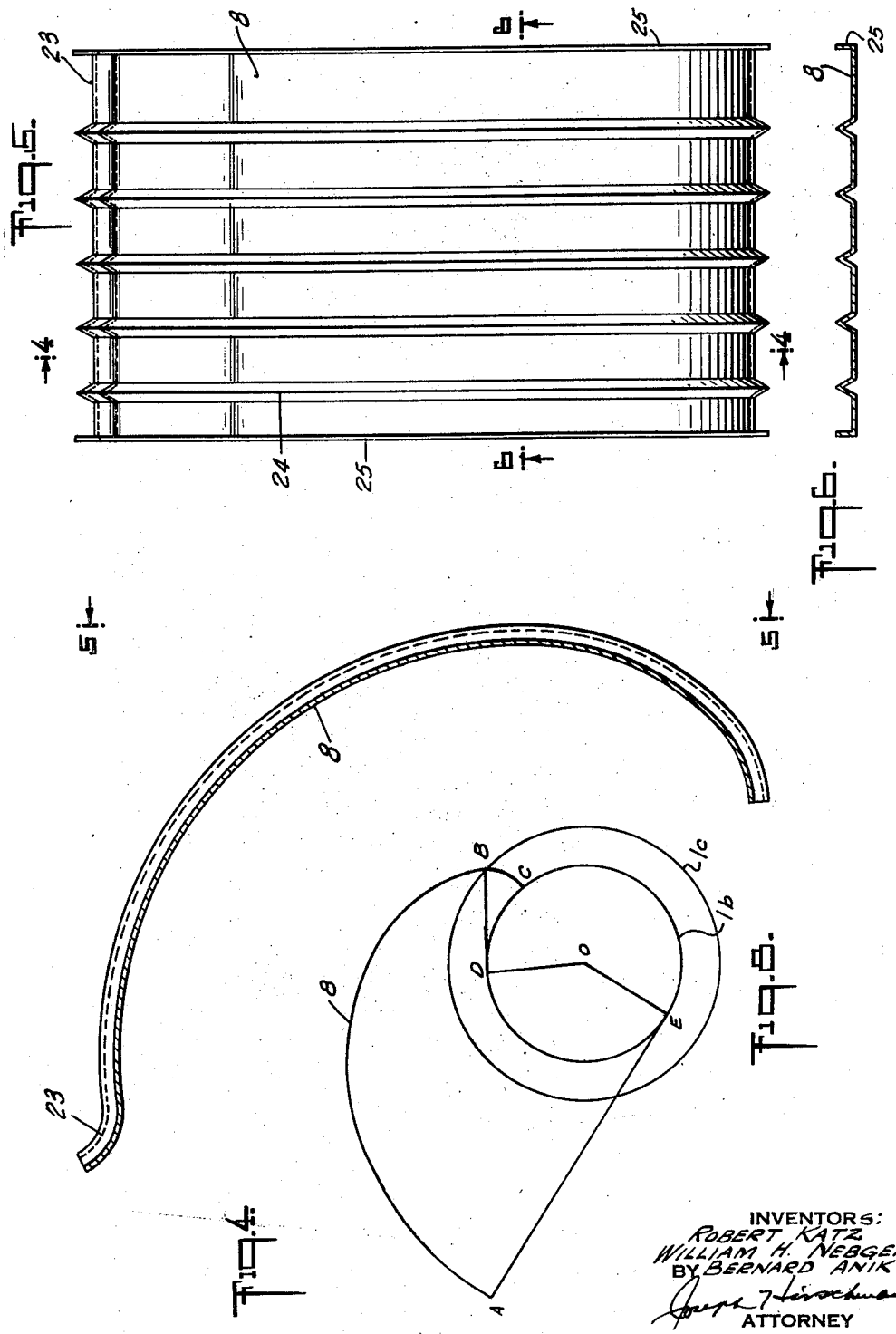
INVENTORS:
ROBERT KATZ
WILLIAM H. NEBGEN
BY BERNARD ANIK
ATTORNEY 2,944,801
Patented July 12, 1960

2,944,801

ROTARY INTERCHANGER WITH DIRECT INTERFACIAL FLUID CONTACT

Robert Katz, 546 Church St., Woodmere, N.Y.; William H. Nebgen, 48—42 43rd St., Woodside, N.Y.; and Bernard Anik, 185 Clinton, Ave., Brooklyn, N.Y.

Filed May 9, 1955, Ser. No. 506,962

15 Claims. (Cl. 261—24)

The present invention relates to rotary interchangers or contactors of the direct interfacial contact type wherein relatively thin streams of fluids are maintained in contact with each other for the purpose of mass and/or heat exchange.

While our invention is applicable for effecting interchange of heat, moisture content and the like between more or less non-miscible fluids, it is of particular advantage for effecting interchange between a liquid and a gas, as between an organic or inorganic liquid and air or other gas.

It is the general object of the present invention to provide an interchanger characterized by simplicity of construction and high efficiency of operation.

More particularly, it is an object of the invention to provide an interchanger of the rotary type wherein interchange between a liquid and a gas in direct contact with each other is caused to take place at a rapid rate and while the fluids are in a state of rapid movement.

Further objects of the invention are to provide a rotary interchanger which is compact in construction and hence has a high output or degree of interchange per unit of volume, is easily assembled, can be cheaply made to a large extent of stamped or otherwise formed sheet metal parts or of molded or cast plastic material, and presents a low degree of resistance to the flow of its fluids, so that the power requirements are relatively low. Other objects and advantages of the invention will appear from the following more detailed description thereof.

We have found that an interchanger of the rotary type can be made highly efficient and capable of a high total heat, vapor or other interchange per unit volume of the interchanger, if the latter is provided with a large number of vanes forming channels of substantially involute shape, i.e., if they have the form of a curve produced by unwinding a cord from a cylinder, the curve being thus one in which the distance from the base circle constantly increases.

We have found that efficient operation of a rotary interchanger (or exchanger) depends in large part on the maintenance of a relatively uniform thickness of liquid film throughout the length of the passages of the interchanger, and also on providing a relatively uniform force for effecting flow of the liquid. Moreover, since one of the fluids must flow from the outer circumference of the interchanger toward the center in order to obtain countercurrent flow, the "fan effect" of the rotating interchanger must be overcome and it is therefore desirable to obtain an adequate rate of flow of the other fluid outwardly, i.e., centrifugally, with the minimum rotational speed of the interchanger.

Our investigations have led to the discovery that the shape of the passages which best satisfies these requirements is that of the involute of a circle, and that the flow and interchange conditions provided by the spirally shaped passages heretofore proposed are much inferior to those obtained with involute-shaped passages.

Apparently, the improved results obtained with our involute-shaped passages are due to the fact that with such passages the force tangent to the curved vanes defining them is substantially constant at any point along such vanes. As this force, created by the rotation of the interchanger, is the force which propels the liquid, the resulting flow is uniform. Also, since the rate at which the liquid film flows along the vanes is proportional to the slope of the vanes measured in the radial direction, improved flow conditions are obtained by involute-shaped vanes, since a curve of such shape starts in the truly radial direction from the surface of the base circle; consequently the involute-shaped vanes will provide the steepest possible slope for a given rotor diameter, together with passageways of substantially constant cross-section, in contrast to straight vanes running in the radial direction which can provide only passageways of constantly increasing cross section. As a result, the rotor can be operated at a relatively low speed to obtain a given rate of flow of liquid film through the involute-shaped passages. Reduction of the rotor speed will reduce the "fan-effect" and the device can therefore be operated with a minimum of power. We have found that the power requirements can be further reduced by minimizing the pressure drop due to entrance conditions at the periphery of the interchanger, and in accordance with a further feature of our invention, the outer ends of the vanes are flared in such manner as to increase the cross-sectional area for the entrance of the air or other gas streams. Thereby the gas velocity is reduced, while providing for an adequate flow of gas into the device.

We have found further that the efficiency of interchange in our improved interchanger is so high that the vanes can extend for less than 360°, i.e. less than one complete convolution, and in fact need extend for not more than about 180°. In consequence, the rotor is of more compact form, is lighter in weight, is easier to assemble, and can therefore be manufactured at relatively low cost.

We have found further that with rotary interchangers, the liquid phase tends to collect toward one side of the vanes, which greatly reduces the efficiency of the device. In accordance with a further development of the present invention, we provide ribs extending in the radial direction which divide the involute-shaped passage into a number of channels and operate to keep the liquid distributed along the width or axial length of the vanes. In our preferred construction, these ribs are staggered and serve also to space the vanes and aid in strengthening and interlocking the vanes.

Our invention will be further described by reference to the accompanying drawing which illustrates several embodiments of our invention without, however, limiting the same thereto. In said drawing, Fig. 1 is an end view of an apparatus embodying the present invention;

Fig. 2 is a front view thereof, partly in section;

Fig. 3 shows the rotor of our improved interchanger in transverse section and is taken along the line III—III of Fig. 2;

Fig. 4 is an enlarged side view of one of the ribbed involute-shaped vanes forming part of the rotor structure, and is taken along the line 4—4 of Fig. 5;

Fig. 5 shows a front elevation of the vane illustrated in Fig. 4;

Fig. 6 is a transverse section along the line VI—VI of Fig. 5;

Fig. 7 is a sectional view illustrating the offset arrangement of the spacing ribs on the vanes of the rotor; while Fig. 8 is a diagram illustrating the properties of the involute shape of the vanes of our improved apparatus.

Referring to Fig. 1, a rotor 1 is mounted on hollow shaft 2, which turns in bearings 3 mounted on support 4 and is driven by motor 5 through V-belt drive 6 and pulleys 6a and 6b. The core 1a of rotor 1 is hollow, and its axis coincides with that of a discharge tube 14 leading from the stationary rotor casing 7 and preferably of the same diameter as the hollow core of the rotor.

The rotor 1 is composed of a relatively large number of curved vanes 8 which are described more in detail hereinbelow and are uniformly spaced from each other to provide correspondingly curved passageways 9. The vanes are held between end plates 10 and 11, and may be either clamped therebetween, as by means of bolts (not shown), or are spot-welded or otherwise secured to the end plates. By this mode of attachment of the vanes to the end plates it becomes unnecessary to provide a support for the vanes at the core of the rotor, the vanes merely radiating from such hollow core. Thereby the resistance to the flow of fluid from the hollow core into the passageways 9 and vice versa is reduced to a minimum. However, if desired, the inner ends of the vanes may be welded or otherwise secured to a central drum provided with slits in its circumference registering with passages 9; or the vanes may be formed with tabs or flanges at the inner ends at spaced points in the axial direction which are secured to each other to provide greater rigidity at the inner ends of the vanes.

A supply tube 12 extends through the hollow shaft 2 and is sealed thereagainst by a suitable stuffing box 13. The tube 12 extends into the interior of the core 1a and is provided with a large number of discharge openings 15 through which a liquid under pressure is ejected in the form of a spray uniformly distributed about the outer circumference of the core 1a. The inner end of the tube 12 may be enlarged so as to bring its outer circumference into close proximity to the ends of the channels 9; or the tube 12 may be connected, as by several hollow spokes, to an annular manifold located adjacent to the inner ends of the channels 9 and provided with a large number of openings in its outer surface. It will be understood that the tube 12 can supply the interchanger with hot or cold water, aqueous solutions of various substances, organic liquids and the like, which are to be subjected to temperature or mass interchange in the apparatus.

The outer ends of the parallel channels 9 are open and debouch into the interior of the casing 7. The liquid received from the tube 12, after passing through channels 9, is discharged into the casing 7 and collects in the sump 16 from which it is evacuated through pipe 17 leading to a centrifugal or other pump 18 driven by motor 5. Air or other gas or vapor is sucked into the casing 1 through a pipe 19 and is compelled to flow centripetally through the channels 9 in countercurrent relation to the streams of liquid in such channels, the numerous streams of gas or the like collecting within the hollow core of the rotor and being drawn off through pipe 14 leading to a blower 20 driven by motor 21 mounted on support 22.

In the operation of the apparatus above described, the rotor 1 is rotated in either direction by the motor 5, but preferably in the direction indicated by arrow A in Fig. 1. The liquid spray discharged by pipe 12 is caught within the channels 9 and is forced to travel outwardly along the surface of the vanes by centrifugal force. At the same time, gas or other liquid is sucked into the casing 7 and forced to travel in the opposite direction through the channels 9, in countercurrent relation to the films of liquid flowing along the vanes 8. The gas is withdrawn from the hollow core of the rotor by the blower 20, and one or both of the two fluids are discharged to a place of further use or re-use.

Although the vanes may, if desired, follow from the very beginning the involute of a circle having the diameter of the hollow core 1a of the rotor, so that the vanes are perpendicular to the circumference of such circle at their inner ends, we prefer to have the vanes follow the curvature of the involute of a circle of somewhat smaller diameter than that of such circle. Such smaller diameter may amount to about 7/10 to 9/10 of the diameter of the hollow core. The involute-shaped vanes will in such case still have the greatest slope possible for a given diameter of rotor, as the curve of the vanes will still start very nearly radially from the circumference of the hollow core 1a. In view of this steep slope of the curve within a given diameter of the rotor, the component of the centrifugal force which advances the liquid films along the vanes will be proportionally so great that the rotor can be rotated at relatively low speed and yet insure the necessary rate of flow of the liquid films along the channels 9. An important result of this feature of our invention is that the "fan effect" of the rotating rotor is greatly reduced and the resistance which the fan or blower 20 must overcome is greatly diminished with corresponding lowering of the power requirements, it being borne in mind that the gas or vapor must be drawn through the channels 9 from their outer ends inwardly. Because of such reduced speed the pumping action of the rotor 1, whereby it tends to force air or other gas outwardly in the same direction as the liquid flow, is correspondingly diminished.

We have found further that the rate of interchange in a rotor of the type above described is so high that the length of the channels 9, and hence of the vanes 8, can be made quite small. Where the length of the channels in a rotary type of interchanger or contactor exceeds one convolution, the pressure drop within the rotor becomes excessive and the physical dimensions of the rotor become so large as to make the device uneconomical. In accordance with the present invention, the vanes extend for considerably less than 360°, and even less than 180°. In a satisfactory construction in accordance with the invention, the length of the vanes could be reduced to such extent that the angle between the radius and the tangent at any point on the curve is now less than 75°. The involute-shaped vanes of our improved construction thus not only maintain a uniform spacing between adjacent vanes throughout their length, but are of such reduced length along the involute curve that the diameter of the rotor is quite small in comparison with the capacity of the interchanger. The reduction in the diameter of the rotor further reduces the fan effect and likewise the power requirements.

In general, we prefer to make the length of the vanes, and hence of the channels, measured along the curve, such that the difference in the lengths of the two tangents drawn from the ends of the vane to the involute generating circle and tangent thereto is less than one circumferential length of such circle. This is illustrated in Fig. 8, wherein 1b represents the base or generating circle of the involute, while 1c indicates the inner bore of the rotor. A vane is shown at 8, its termini being indicated at A and B. It will accordingly be seen that in our preferred construction the length of the vane is such that the difference in length between the tangents AE and BD is less than the length of the circumference of circle 1b. Of course, in the case where the vane begins at the generating circle 1b, i.e., at C, the length of the tangent from C to the circle 1b is zero, and the length of the vane is then defined by the length of the other tangent which in such case is not to exceed the circumferential length of the generating circle. With such reduced length of the vanes, the pressure drop through the rotor is considerably lower than that experienced in known types of rotary interchangers.

In accordance with a further feature of the present invention, the pressure drop due to entrance conditions at the outer ends of the channels can be minimized by suitably flaring or reversely bending the outer ends of the vanes as shown at 23 in Figs. 3 and 4. Thereby the entrance cross-sectional area is increased and the gas velocity at such entrance is reduced.

As best illustrated in Figs. 4, 5 and 6, the vanes are provided with a plurality of ribs 24 which extend along the curve of the vanes and are spaced in the axial direction and serve a number of functions. In the first place, they strengthen the vanes, so that the latter can be made of thinner material. A further and more important function of the ribs is to subdivide the channels into a plurality of passageways so that the liquid is more or less uniformly distributed in the axial direction within each channel. Any tendency of the liquid to flow axially is prevented by the ribs. As the ribs more or less enclose the streams of liquid which enter between any two vanes, there is little or no possibility of a liquid from one stream flowing into the next adjacent stream confined between the next pair of adjacent vanes. Consequently, it becomes unnecessary to provide for exact orientation of the vanes in the axial direction, which greatly reduces the cost of assembly and of manufacture.

The ribs 24 are preferably made of a height equal to the distance between adjacent vanes so that they serve as spacers for the vanes. To this end the ribs of adjacent vanes are offset from each other as shown in Fig. 7. In the assembled condition, the ribs effect an interlock between the vanes and produce a strong and rigid structure. The ribs may be stamped in the vanes or may be constituted of separate parts, like angular members which are welded or otherwise secured to the vanes.

The vanes are preferably provided with flanges 25 at each of their side edges and by means of which they may be welded or attached in any other siutable way, as by rivets, to the end plates 10 and 11.

The vanes may be made from sheet material of various kinds, such as mild steel, stainless steel, aluminum, various alloys and the like, and may also be made of plastic material, and of clad metals.

As will be evident, certain features of our invention can be embodied in rotary interchangers or contactors in which the vanes are not necessarily of involute shape but follow a curve of constantly or progressively increasing radius. In particular, the rib structure whereby the vanes are reinforced and maintained in spaced relation, while the films of liquid are divided into a plurality of streams which are prevented from accumulating at one side of the vanes while leaving the other side more or less bare with serious loss of efficiency, can be incorporated in various types of vanes, as can the flaring or reverse bending of the outer ends of the vanes.

It will be apparent from the foregoing that we have provided a compact rotary interchanger in which the liquid is distributed into very narrow channels and in which the vanes are relatively short in radial length as above explained, or expressed differently, are of such length that the length of a straight line running from the outer end of a vane and tangent to the circumference of the circle defining the hollow core is less than the circumference of such circle. Thus, by way of example, a rotor having a hollow core diameter of 12 inches and having an outside diameter of about 30 inches, is provided with about 150 vanes of involute shape, each of which is about 24 inches long (measured along the curve). The axial length of the vanes is about 8 inches; and the ribs are spaced about one inch apart. The vanes are about ⅛ inch apart, and this spacing is maintained substantially uniformly throughout the length of the vanes.

We claim:

1. In a device for effecting thin film countercurrent direct contact between a gas and a liquid, a rotor comprising a multiplicity of substantially identical thin partitions, each partition conforming in the shape of its longitudinal cross-section to a portion of the involute of a circle, the width of each partition being substantially uniform throughout the length of said partition, said partitions being circumferentially spaced about the center of the involute circle, said spaced partitions defining a multiplicity of substantially identical passages of substantially constant width transversely to the width of the partitions and of substantially constant cross-sectional area throughout the length of each passage, the inner and outer ends of the passages being open, means for closing the curved sides of said passages, means for introducing a liquid into the open inner ends of said passages at such a rate that said liquid only partially fills said passages, means whereby said rotor may be rotated about an axis through the center of said involute circle at a sufficiently high speed so that said liquid will be propelled by centrifugal force along said partitions to the open outer ends of said passages as a thin liquid film on the sides of the partitions defining said passages, and means for propelling a gas from the open outer ends of said passages to the open inner ends thereof, in countercurrent flow to the liquid films.

2. A device as defined in claim 1, wherein the length of each partition is such that the difference between the lengths of lines drawn from the ends of the partition to the involute circle and tangent thereto is less than one circumferential length of said involute circle.

3. In a device for effecting thin-film countercurrent direct contact between a gas and a liquid, a rotor comprising a multiplicity of substantially identical thin partitions defining a plurality of passages, each partition conforming in the shape of its longitudinal cross-section to a part of the involute of a circle, uniform ribs attached to said partitions and dividing each passage into a plurality of substantially identical parallel channels, said channels being of substantially uniform width throughout the length of said partitions, said ribs equidistantly spacing said partitions circumferentially about the center of said involute circle, means for fastening adjacent partitions to each other, means for closing the curved sides of said passages, means for introducing a liquid into the open inner ends of said passages at such a rate that said liquid only partially fills said passages, means whereby said rotor may be rotated about an axis through the center of said involute circle at a sufficiently high speed so that said liquid will be propelled by centrifugal force along said partitions to the open outer ends of said passages as a thin liquid film on the sides of the partitions defining the passages, and means for propelling a gas from the open outer ends of said passages to the open inner ends thereof in countercurrent flow to the liquid films.

4. In a device for effecting thin-film counter-current direct contact between a gas and a liquid, a rotor comprising a multiplicity of substantially identical thin partitions, each partition conforming in the shape of its longitudinal cross-section to a portion of the involute of a circle, the length of said portion being such that the difference in length of the lines which are tangent to said circle and which intersect the end points of a partition is less than one circumferential length of said circle, the width of each partition being substantially uniform throughout the length of the partition, said partitions being equidistantly spaced circumferentially about the center of said involute circle by uniform ribs fastened to the lateral edges of said partitions, means for attaching adjacent partitions one to another, said spaced partitions defining a multiplicity of substantially identical passages of substantially constant height transversely to the width of the partitions and of substantially constant cross-sectional area throughout the length of said passages, the curved lateral edges of said passages being substantially closed by said ribs, means for introducing a liquid into the open inner ends of said passages at such a rate that said liquid only partially fills said passages, means whereby said rotor may be rotated about an axis through the center of said involute circle at a sufficiently high speed so that said liquid will be propelled by centrifugal force along along said partitions to the open outer ends of said passages as a thin liquid film on the sides of the partitions defining the passages, and means for propelling a gas from the open outer ends of said passages to the open inner ends thereof in counter-current flow to the liqiud films.

5. In a device for effecting thin-film counter-current direct contact between a gas and a liquid, a rotor comprising a multiplicity of spaced substantially identical thin partitions, each partition conforming in the shape of its longitudinal cross-section to a portion of the involute of a circle, the length of said portion being such that the difference in length of the lines which are tangent to said circle and which intersect the end points of a partition is less than one circumferential length of said circle, said partitions defining a multiplicity of substantially identical passages, each passage being of substantially constant width and substantially constant cross-sectional area throughout the length thereof, uniform ribs attached to said partitions and dividing the passages along their widths into a multiplicity of substantially identical parallel channels, said channels being of substantially uniform width throughout the length of said partition, said ribs equidistantly spacing said partitions circumferentially about the center of said circle, means for fastening adjacent partitions to each other, means for closing the curved sides of said passages, means for introducing a liquid into the open inner ends of said passages at such a rate that said liquid only partially fills such passages, means whereby said rotor may be rotated about an axis through the center of said involute circle at a sufficiently high speed so that said liquid will be propelled by centrifugal force along said partitions to the open outer ends of said passages as a thin liquid film on the sides of the partitions defining the passages, and means for propelling a gas from the open outer ends of said passages to the open inner ends thereof in countercurrent flow to the liquid films.

6. In a device for effecting thin-film countercurrent direct contact between a gas and a liquid, a rotor comprising a multiplicity of substantially identical thin partitions, each partition conforming in the shape of its longitudinal cross-section to a portion of the involute of a circle, the width of each partition being substantially uniform throughout the length of the partition, ribs formed in said partitions and equidistantly spacing the same about the center of the involute circle, means for attaching adjacent partitions to each other, said spaced partitions defining a multiplicity of substantially identical passages of substantially constant height transversely to the width of the partitions and of substantially constant cross-sectional area throughout the length of each passage, means for closing the curved sides of said passages, means for introducing a liquid into the open inner ends of said passages at such a rate that liquid only partially fills said passages, means whereby said rotor may be rotated about an axis through the center of said involute circle at a sufficiently high speed so that said liquid will be propelled by centrifugal force along said partitions to the open outer ends of said passages as a thin liquid film on the sides of the partitions defining the passages, and means for propelling a gas from the open outer ends of said passages to the open inner ends thereof in countercurrent flow to the liquid films.

7. In a device for effecting thin-film countercurrent direct contact between a gas and a liquid, a rotor comprising a multiplicity of substantially identical thin partitions, each partition conforming in the shape of its longitudinal cross section to a portion of the involute of a circle, the length of said portion being such that the difference in length of the lines which are tangent to said circle and which intersect the end points of a partition, is less than one circumferential length of said circle, the width of each partition being substantially uniform throughout the length of the partition, ribs equidistantly spacing said partitions about the center of said involute circle, said ribs being formed at the lateral edges of said partitions, means for attaching adjacent partitions to each other, said spaced partitions defining a multiplicity of substantially identical passages of substantially constant height transversely to the width of the partitions and of substantially constant cross-sectional area throughout the length of each passage, said ribs closing the curved sides of said passages, means for introducing a liquid into the open inner ends of said passages at such a rate that said liquid only partially fills said passages, means whereby said rotor may be rotated about an axis through the center of said involute circle at a sufficiently high speed so that liqiud will be propelled by centrifugal force along said partitions to the open outer ends of said passages as a thin liquid film on the sides of the partitions defining the passages, and means for propelling a gas from the open outer ends of said passages to the open inner ends thereof in countercurrent flow to the liquid films.

8. In a rotary gas-liquid contactor, cuved partitions providing a multiplicity of substantially identical curved passages and equidistantly spaced circumferentially about the center of a circle, said passages being open at their inner and outer ends, the passages extending along their curved lengths in directions parallel to the plane of said circle, the width of said passages being normal to the plane of said circle, the width and cross-sectional area of each of said passages being substantially uniform throughout the length of their curve, means for closing the curved sides of said passages, means for introducing a liquid into the open inner ends of said passages at such a rate that said liquid only partially fills said passages, means whereby said partitions may be rotated in a body about an axis normal to the plane of and passing through the center of said involute circle at a sufficiently high speed so that said liquid will be propelled by centrifugal force along said partitions to the open outer ends of said passages as a thin liquid film on the sides of the partitions defining said passages, and means for propelling a gas from the open outer ends of said passages to the open inner ends thereof, in countercurrent flow to the liquid films.

9. In a device for effecting thin film countercurrent direct contact between a gas and a liquid, a rotor comprising a multiplicity of substantially identical thin partitions, each partition conforming in the shape of its longitudinal cross-section to a portion of the involute of a circle, said partitions being equidistantly spaced circumferentially about the center of said involute circle to define a multiplicity of substantially identical passages of substantially constant height transversely to the axial width of the partitions and of substantially constant cross-sectional area throughout the length of each passage, the inner and outer ends of the passages being open, means for closing the curved sides of said passages, means for subdividing the said passages along their widths into a plurality of substantially identical parallel channels, said channels being of substantially uniform width throughout the length of said partitions, means for introducing a liquid into the open inner ends of said passages at such a rate that said liquid only partially fills said passages, means whereby said rotor may be rotated about an axis through the center of said involute circle at a sufficiently high speed so that said liquid will be propelled by centrifugal force along said partitions to the open outer ends of said passages as a thin liquid film on the sides of the partitions defining said passages, and means for propelling a gas from the open outer ends of said passages to the open inner ends thereof, in countercurrent flow to the liquid films.

10. A device as defined in claim 9, wherein said subdividing means comprises ribs formed in said partitions, said ribs also equidistantly spacing said partitions circumferentially about the center of said involute circle, and means for fastening adjacent partitions to each other.

11. A device as defined in claim 9, wherein the length of the portion of the involute of a circle to which the length of each partition conforms is such that the difference in length of the lines which are tangent to said circle and which intersect the end point of a partition is less than one circumferential length of said circle, the subdividing means comprising uniform ribs formed in said partitions and dividing each of the passages into a plurality of substantially identical parallel channels, said ribs also equidistantly spacing said partitions circumferentially about the center of said circle, and means for fastening adjacent partitions to each other.

12. A device as defined in claim 9, wherein the length of each partition is such that the difference between the lengths of lines drawn from the ends of the partition to the involute circle and tangent thereto is less than one circumferential length of said circle.

13. In a rotary gas-liquid contactor, curved partitions providing a multiplicity of substantially identical curved passages and equidistantly spaced circumferentially about the center of a circle, said passages being open at their inner and outer ends, the width and cross-sectional area of said passages being substantially uniform throughout the length of their curve, the passages extending along their curved lengths in directions parallel to the plane of said circle, the width of each passage being normal to the plane of said circle, means for subdividing said passages along their width into a plurality of substantially identical parallel channels, means for closing the curevd sides of said passages, means for introducing a liquid into the open inner ends of said passages at such a rate that said liquid only partially fills said passages, means whereby said partitions may be rotated in a body about an axis normal to the plane of and passing through the center of said involute circle at a sufficiently high speed so that said liquid will be propelled by centrifugal force along said partitions to the open outer ends of said passages as a thin liquid film on the sides of the partitions defining said passages, and means for propelling a gas from the open outer ends of said passages to the open inner ends thereof, in countercurrent flow to the liquid films.

14. In a device for effecting thin film countercurrent contact between a gas and a liquid, a rotor having a hollow central portion and spaced curved partitions extending from the periphery of said hollow portion and providing a multiplicity of passages open at their inner and outer ends and communicating with the interior of said hollow central portion, the passages being of substantially uniform width and cross-sectional throughout their lengths, said partitions each subtending an angle of less than 180° at the center of the rotor, means for distributing a liquid about the periphery of said central portion to be received in said passages and at such a rate that said liquid only partially fills said passages, means whereby said rotor may be rotated about an axis through the center of said involute circle at a sufficiently high speed so that said liquid will be propelled by centrifugal force along said partitions to the open outer ends of said passages as a thin liquid film on the sides of the partitions defining said passages, and means for propelling a gas from the open outer ends of said passages to the open inner ends thereof, in countercurrent flow to the liquid films.

15. A device as defined in claim 14, wherein the partitions subtend an angle of about 90° and conform approximately to the shape of the involute of a circle.

References Cited in the file of this patent

UNITED STATES PATENTS

| | | |
|---|---|---|
| 929,129 | Harder | July 27, 1909 |
| 1,644,089 | Salerni | Oct. 4, 1927 |
| 1,973,051 | Doolittle | Sept. 11, 1934 |
| 2,152,360 | Robic | Mar. 28, 1939 |
| 2,284,195 | Goodman et al. | May 26, 1942 |
| 2,586,692 | Morel | Feb. 19, 1952 |
| 2,721,623 | Fletcher et al. | Oct. 25, 1955 |